United States Patent [19]

Nakamura

[11] Patent Number: 4,610,514
[45] Date of Patent: Sep. 9, 1986

[54] TELEPHOTO LENS SYSTEM

[75] Inventor: Akiyoshi Nakamura, Sakai, Japan

[73] Assignee: Minolta Camera Kabushiki Kaisha, Osaka, Japan

[21] Appl. No.: 539,826

[22] Filed: Oct. 6, 1983

[30] Foreign Application Priority Data

Oct. 7, 1982 [JP] Japan .................. 57-176702
Oct. 7, 1982 [JP] Japan .................. 57-176703

[51] Int. Cl.⁴ .................................. G02B 9/60
[52] U.S. Cl. ........................... 350/455; 350/475
[58] Field of Search ........... 350/454, 455, 456, 457, 350/475, 476

[56] References Cited

U.S. PATENT DOCUMENTS

| Re. 30,708 | 8/1981 | Momiyama . | |
|---|---|---|---|
| 4,045,128 | 8/1977 | Momiyama . | |
| 4,113,357 | 9/1978 | Nakamura . | |
| 4,240,703 | 12/1980 | Momiyama | 350/454 |
| 4,348,084 | 9/1982 | Kitagishi et al. . | |
| 4,359,272 | 11/1982 | Kreitzer | 350/455 |

FOREIGN PATENT DOCUMENTS 56-159613 12/1981 Japan .
56-165110 12/1981 Japan .

*Primary Examiner*—John K. Corbin
*Assistant Examiner*—Paul Dzierzynski
*Attorney, Agent, or Firm*—Price, Gess & Ubell

[57] ABSTRACT

A telephoto lens system comprises, from the object side to the image side, a first positive lens unit, a second negative lens unit, and a third positive lens unit, the second lens unit alone being shiftable along the optical axis with the first and third lens units being stationary for focusing the whole lens system. The first lens unit consists of a first positive component, a second positive meniscus component convex to the object side, and a third negative component of a doublet composed of cementing together a positive meniscus lens convex to the object side and a negative meniscus lens convex to the object side, the cemented surface of the third component being convex to the object side. Another feature is characterized that the light pencils exited from the second lens unit are properly convergent.

10 Claims, 42 Drawing Figures

Spherical Aberration

Astigmatism

Distortion

Spherical Aberration

Astigmatism

Distortion

Spherical Aberration

Astigmatism

Distortion

Spherical Aberration

Astigmatism

Distortion

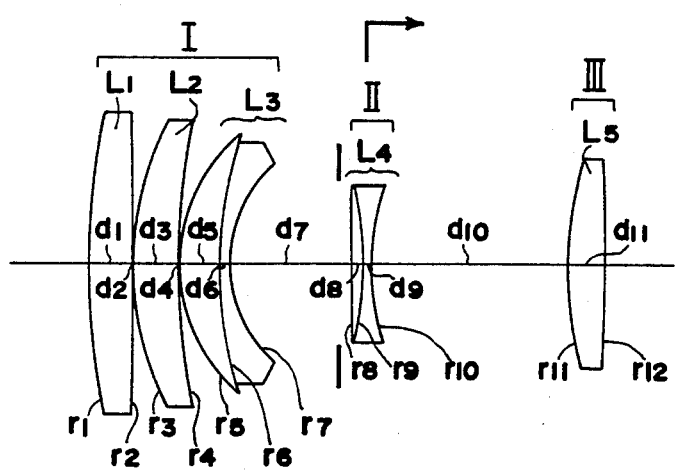
FIG. 7
FIG. 8A
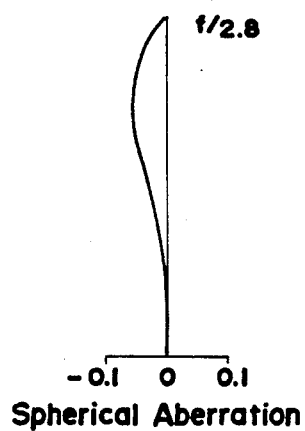
Spherical Aberration
FIG. 8B
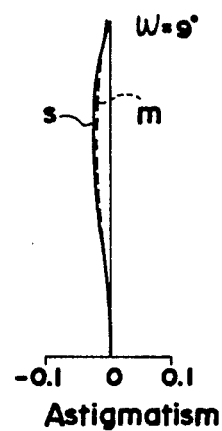
Astigmatism
FIG. 8C
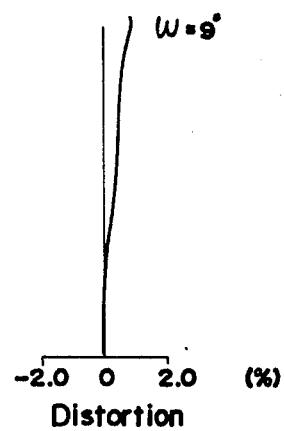
Distortion
FIG. 9A
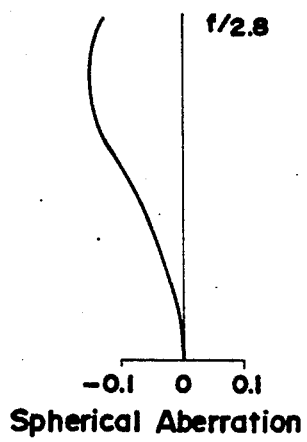
Spherical Aberration
FIG. 9B
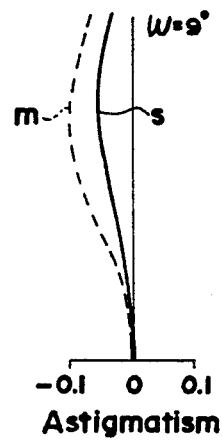
Astigmatism
FIG. 9C
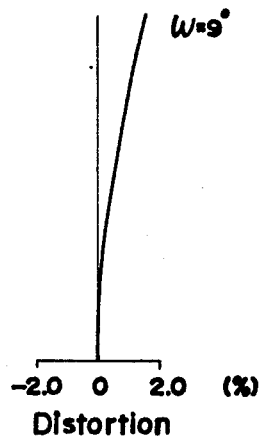
Distortion

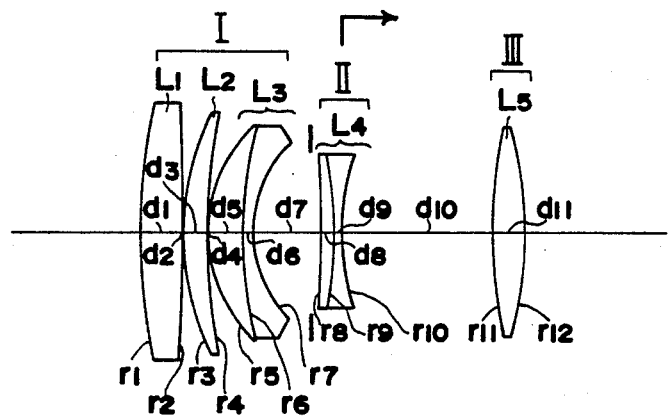
FIG.10
FIG.11A
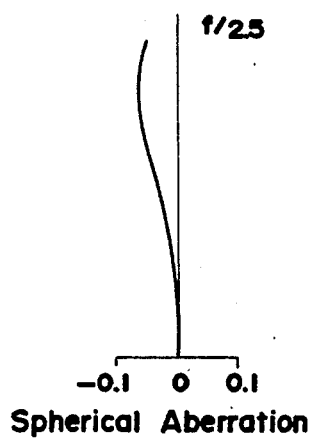
Spherical Aberration
FIG.11B
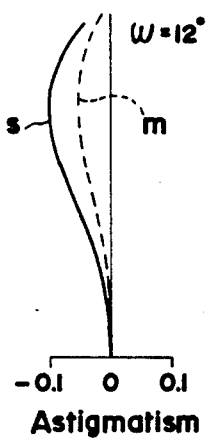
Astigmatism
FIG.11C
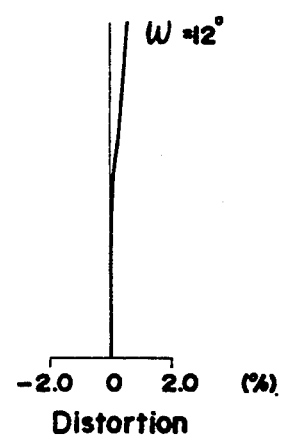
Distortion
FIG.12A
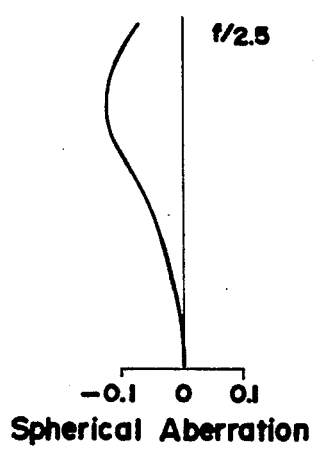
Spherical Aberration
FIG.12B
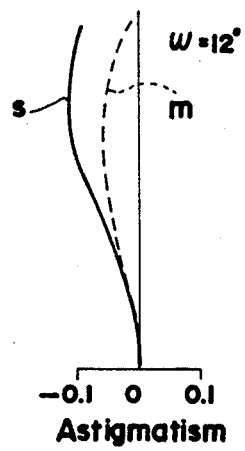
Astigmatism
FIG.12C
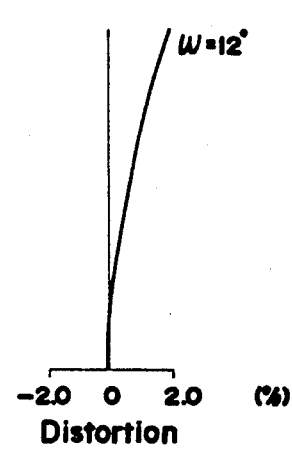
Distortion Spherical Aberration Astigmatism Distortion Spherical Aberration Astigmatism Distortion FIG.16
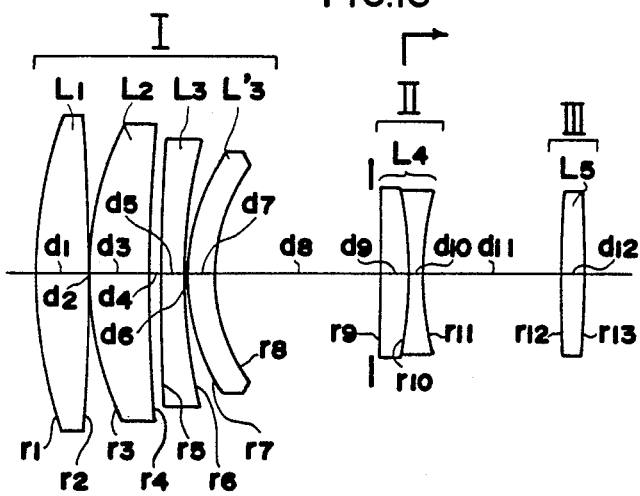
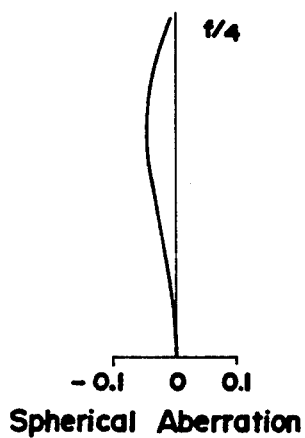
FIG.17A
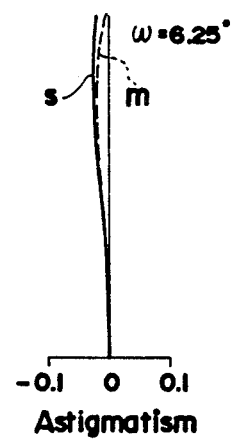
FIG.17B
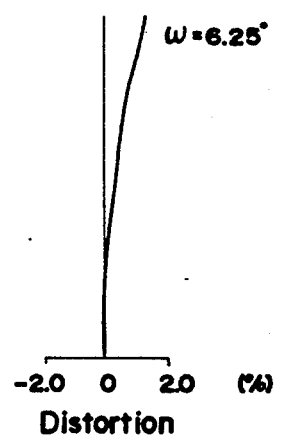
FIG.17C
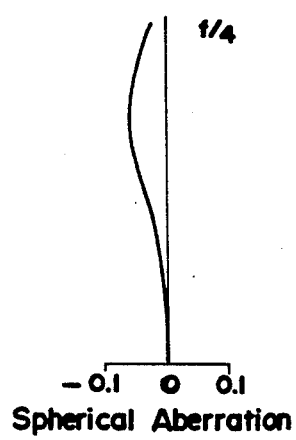
FIG.18A
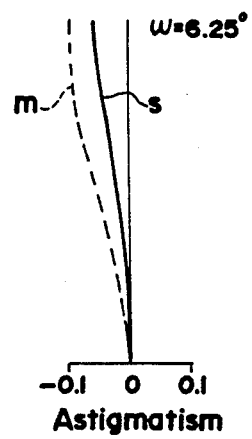
FIG.18B
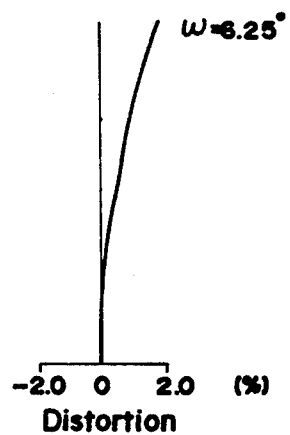
FIG.18C

TELEPHOTO LENS SYSTEM

BACKGROUND OF THE INVENTION

1. Field of the Invention

The present invention relates to a telephoto lens system, and more particularly to an improvement of an internal focusing type telephoto lens system.

2. Description of the Prior Art

In the field of this art, it has been well known to provide a photographic lens system in which the whole lens system is shiftable along the optical axis for focusing thereof. This is sometimes a relatively easy expedient for focusing in smaller compact lens system of a fixed focal length. However, in a telephoto type lens system, its diameter, overall length and weight are by necessity increased over both a standard type or wide angle type lens system. Thus, any focusing arrangement which requires the shifting of the entire telephoto lens system would also requires mechanisms that are by necessity relatively complex, strong and durable. Additionally, the shifting distance for focusing is also necessarily increased. Therefore, a focusing arrangement which requires the shifting of the whole lens system would not be favorable for a telephoto lens system.

Thus, in the field of telephoto lens systems, there have been provided various designs in which a part of the whole lens system alone is shiftable for focusing thereof. For example, Japanese Laid-Open Patent No. SHO 56-165110 discloses a telephoto lens system in which an internal lens unit is shiftable for focusing. The focusing arrangement of this internal focusing type would require mechanisms that are compact and lightweight in comparison with mechanisms required for shifting of the whole lens system. In the above-mentioned Japanese patent, the embodiment discloses a telephoto lens system of an internal focusing type which comprises, from the object side to the image side, a first positive lens unit, a second negative lens unit, a third negative lens unit, and a fourth positive lens unit, the third lens unit alone being shiftable along the optical axis for focusing with other lens units being stationary. The lens system of the above-mentioned embodiment has the F-number of 1:2.8, and the field angle of 12.3° which corresponds to the focal length of 200 mm with respect to 35 mm SLR cameras.

SUMMARY OF THE INVENTION

An object of the present invention is to provide a telephoto lens system of an internal focusing type in which changes of various aberrations due to a focusing operation are decreased while maintaining a compact size.

Another object of the present invention is to provide a telephoto lens system of an internal focusing type in which various aberrations are sufficiently corrected over the entire focusing range.

Still another object of the present invention is to provide a telephoto lens system of an internal focusing type capable of achieving a relatively wide field angle which is greater than 12°.

According to the present invention, one feature provides a telephoto lens system of an internal focusing type comprising from the object side; a first positive lens unit, a second negative lens unit and a third positive lens unit, the second lens unit alone being shiftable along the optical axis with the first and third lens units being stationary for focusing, wherein a doublet composed by cementing together a positive meniscus lens convex to the object side and a negative meniscus lens convex to the object side is included in the first lens unit for achieving the relatively wide field angle. Another feature of the present invention provides a telephoto lens system of an internal focusing type comprising from the object side; a first positive lens unit, a second negative lens unit and a third positive lens unit, the second lens unit alone being shiftable along the optical axis with the first and third lens units being stationary for focusing, wherein the light pencils exited from the second lens unit are properly convergent for maintaining the compactness.

BRIEF DESCRIPTION OF THE DRAWINGS

FIG. 7 is a cross-sectional schematic view disclosing a third embodiment as Embodiment 3;

FIGS. 8A, 8B and 8C disclose respectively the spherical aberration, astigmatism, and distortion when the third embodiment is focused at infinity;

FIGS. 9A, 9B and 9C disclose respectively the spherical aberration, astigmatism, and distortion when the third embodiment is focused at a magnification of 1/10;

FIG. 10 is a cross-sectional schematic view disclosing a fourth embodiment as Embodiment 4;

FIGS. 11A, 11B and 11C disclose respectively the spherical aberration, astigmatism, and distortion when the fourth embodiment is focused at infinity;

FIGS. 12A, 12B and 12C disclose respectively the spherical aberration, astigmatism, and distortion when the fourth embodiment is focused at a magnification of 1/10;

FIG. 16 is a cross-sectional schematic view disclosing a sixth embodiment as Embodiment 6;

FIGS. 17A, 17B and 17C disclose respectively the spherical aberration, astigmatism, and distortion when the sixth embodiment is focused at infinity; and FIGS. 18A, 18B and 18C disclose respectively the spherical aberration, astigmatism, and distortion when the sixth embodiment is focused at a magnification of 1/10.

DETAILED DESCRIPTION OF THE PREFERRED EMBODIMENTS

Figure 1:
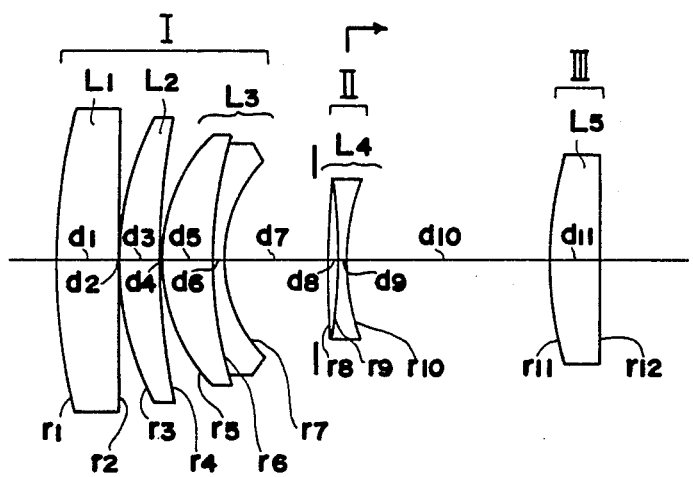
FIG. 1 is a cross-sectional schematic view disclosing a first embodiment as Embodiment 1.
Figure 2A:
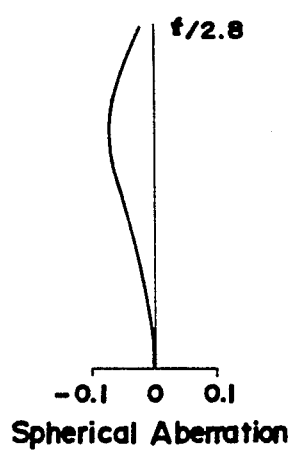
FIGS. 2A, 2B and 2C disclose respectively the spherical aberration, astigmatism, and distortion when the first embodiment is focused at infinity.
Figure 2B:
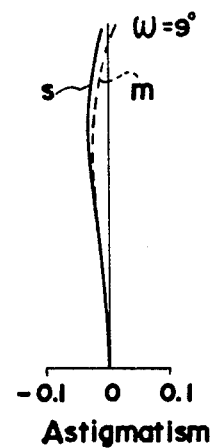
Figure 2C:
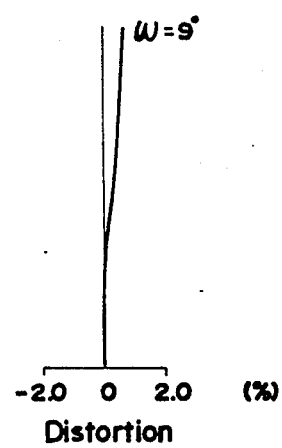
Figure 3A:
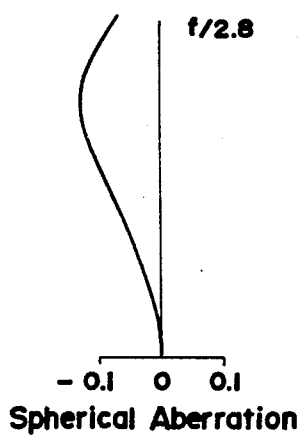
FIGS. 3A, 3B and 3C disclose respectively the spherical aberration, astigmatism, and distortion when the first embodiment is focused at a magnification of 1/10.
Figure 3B:
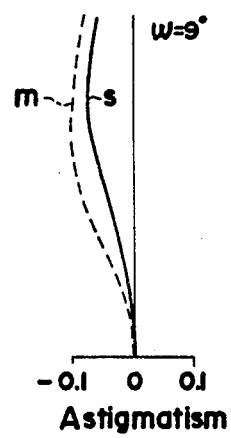
Figure 3C:
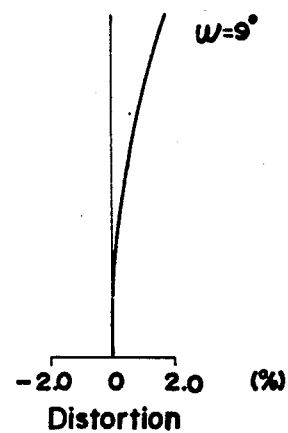

The following description is provided to enable any person skilled in the optical and camera field to make and use the invention and sets forth the best modes contemplated by the inventor for carrying out his invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm SLR camera.

In the drawings, schematic cross sectional views disclose the position of the lens units and lens elements. The radii of curvature and axial distances for each lens element and air space are provided in the accompanying tables set forth herein, and the schematic cross sectional views of the respective embodiments follow the normal conventions of an object at the left-hand side of the drawing and the image plane at the right-hand side.

As shown in FIGS. 1, 4, 7, 10 and 13, the present invention provides a telephoto lens system of an internal focusing type comprising, from the object side to the image side, a first lens unit (I) of a positive refractive power consisting of a first positive component ($L_1$), a second positive meniscus component ($L_2$) convex to the object side, and a third negative component ($L_3$) of a doublet composed by cementing together a positive meniscus lens convex to the object side and a negative meniscus lens convex to the object side, the cemented surface ($r_6$) in the third component being convex to the object side; a second lens unit (II) of a negative refractive power consisting of a doublet ($L_4$) composed by cementing a positive lens and a negative lens; a third lens unit (II) of a positive refractive power including at least a positive component ($L_5$); the second lens unit (II) alone being shiftable along the optical axis with the first and third lens being units stationary for focusing the whole lens system.

According to the above-mentioned feature of the present invention, the spherical aberration which would be generated in the first lens unit (I) is sufficiently corrected both by the second component ($L_2$) of a meniscus lens convex to the object side, and by the third component ($L_3$) in which the object side surface ($r_5$) and the image side surface ($r_7$) are convex to the object side. The distortion and astigmatism are sufficiently corrected by the positive refractive power of the third lens unit (II). Furthermore, the deviation of the chromatic aberration, whose correction is a serious problem for the telephoto lens system, is decreased by means of applying the doublet to the third component ($L_3$). The cemented surface ($r_6$) of the third component ($L_3$) is convex to the object side so that an undesirable influence would not be caused for the off-axial pencils, in the case when the difference in refractive index between the two cemented lenses of the third component ($L_3$) is considerably large for correcting the field curvature.

Furthermore, in order to decrease the change of the chromatic aberration during a focusing operation, the doublet composed by cementing the positive lens and the negative lens is applied to the second lens unit (II) which is shiftable for focusing. Namely, the change of the chromatic aberration during a focusing operation can be decreased by means of setting the compound Abbe number of the positive lens and the negative lens as high as possible. The negative deviation of the spherical aberration due to a focusing operation to a closer object is sufficiently controlled by the strong refractive power of the cemented surface ($r_9$) in the second lens unit (II).

Furthermore, another feature of the present invention provides, a telephoto lens system of an internal focusing type comprising, from the object side to the image side, a first lens unit (I) of a positive refractive power, a second lens unit (II) of a negative refractive power, a third lens unit (III) of a positive refractive power, the second lens unit (II) being shiftable along the optical axis with the first and third lens units (I) (II) being stationary for focusing the whole lens system, wherein the lens system fulfills the following condition:

$$1.5f < f_{I\ II} < 2.1f$$

wherein:

f represents the focal length of the whole lens system in the infinity focusing condition, and $f_{I\ II}$ represents the compound focal length of the first and second lens units.

Condition (1) is satisfied by Embodiment 1, 2, 3 and 6 as shown below.

The present invention is further characterized by the fact that the compound focal length of the first and second lens units is limited within a predetermined range for maintaining the compactness, and for sufficiently controlling the changes of various aberrations in a focusing operation. The compactness of the lens system is maintained by controlling the telephoto ratio of the lens system within a proper range. Condition (1) defines the above-mentioned predetermined range of the compound focal length of the first and second lens units (I) (II). If the lower limit of condition (1) is violated, since the total length of the whole lens system is increased, the compactness of the lens system can not be maintained. Furthermore, if the telephoto ratio is controlled within the proper range for maintaining the compactness, the back focal length of the lens system is so short that the lens system can not be applied to a taking lens of a 35 mm SLR camera. If the upper limit of condition (1) is violated, the refractive power of the third lens unit (II) becomes so strong that the telephoto ratio can not be controlled within the proper range.

Figure 4:
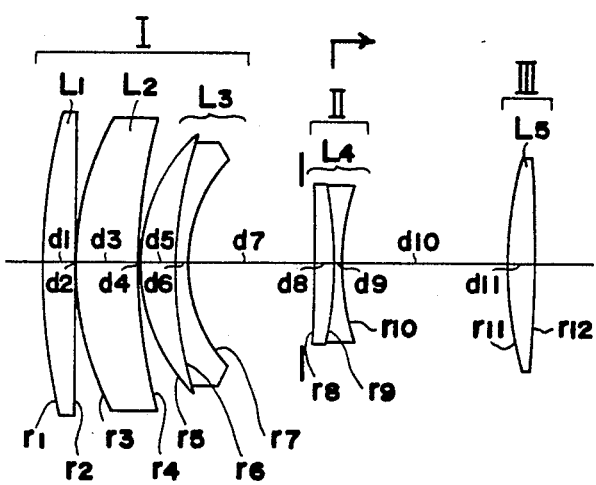
FIG. 4 is a cross-sectional schematic view disclosing a second embodiment as Embodiment 2.
Figure 5A:
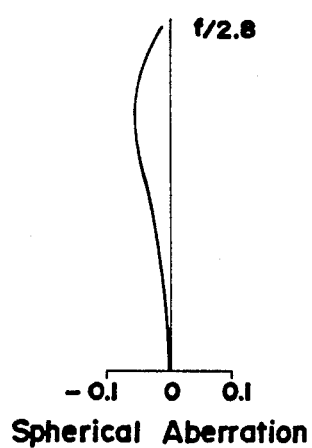
FIGS. 5A, 5B and 5C disclose respectively the spherical aberration, astigmatism, and distortion when the second embodiment is focused at infinity.
Figure 5B:
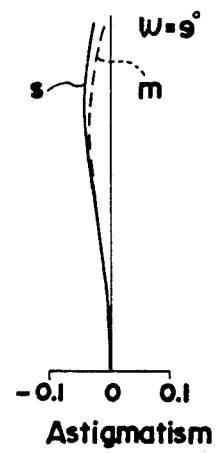
Figure 5C:
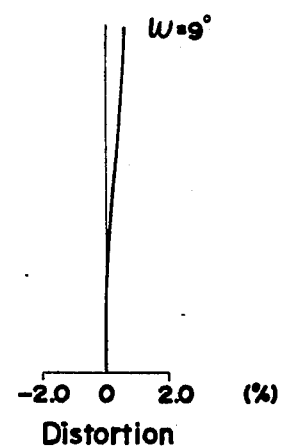
Figure 6A:
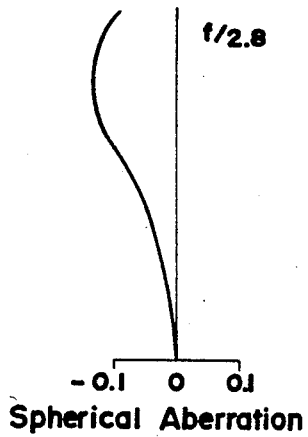
FIGS. 6A, 6B and 6C disclose respectively the spherical aberration, astigmatism, and distortion when the second embodiment is focused at a megnification of 1/10.
Figure 6B:
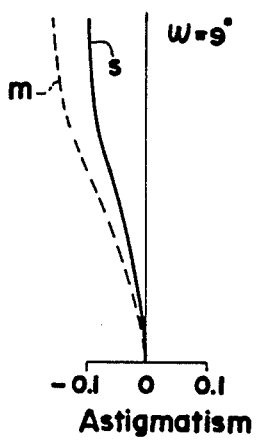
Figure 6C:
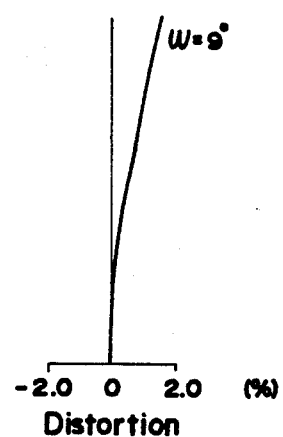
Figure 13:
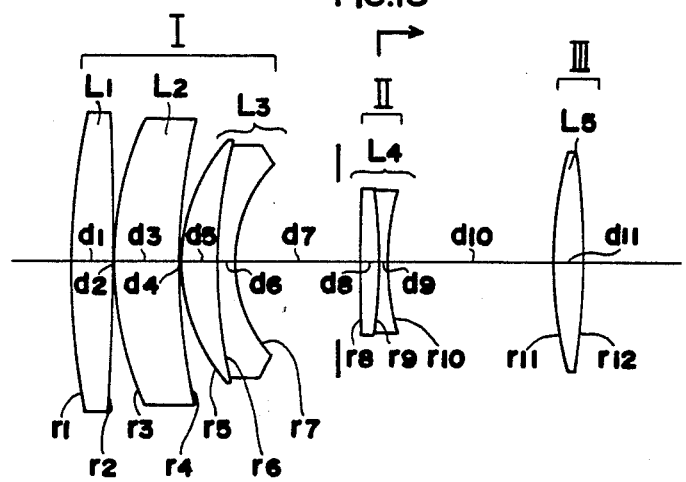
FIG. 13 is a cross-sectional schematic view disclosing a fifth embodiment as Embodiment 5.
Figure 14A:
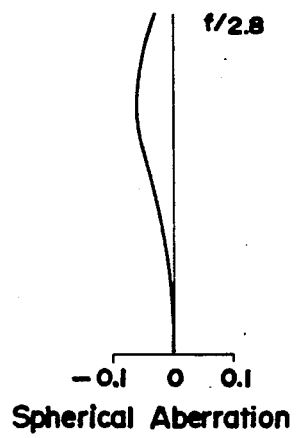
FIGS. 14A, 14B and 14C disclose respectively the spherical aberration, astigmatism, and distortion when the fifth embodiment is focused at infinity.
Figure 14B:
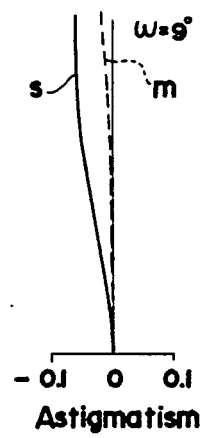
Figure 14C:
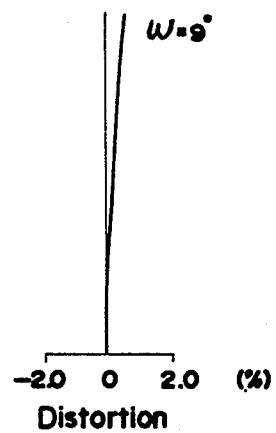
Figure 15A:
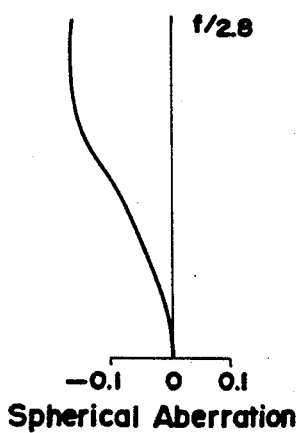
FIGS. 15A, 15B and 15C disclose respectively the spherical aberration, astigmatism, and distortion when the fifth embodiment is focused at a magnification of 1/10.
Figure 15B:
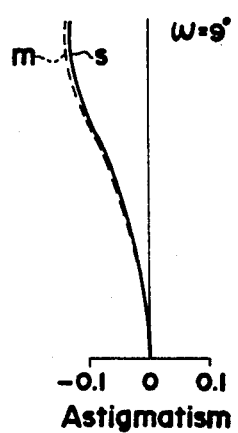
Figure 15C:
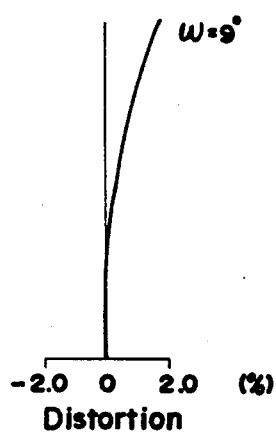

Here, the first lens unit (I) is consisting of, from the object side to the image side, a first positive component ($L_1$), a second positive meniscus component ($L_2$) convex to the object side, and a third negative component ($L_3$) of a doublet composed by cementing together a positive meniscus lens convex to the object side and a negative meniscus lens convex to the object side, the cemented surface ($r_6$) in the third component ($L_3$) being convex to the object side as shown in FIGS. 1, 4, and 7. However, in Embodiment 6 shown in FIG. 16, the first lens unit (I) is consisting of, from the object side to the image side, the above-mentioned first component ($L_1$), the above-mentioned second component ($L_2$), a third negative component ($L_3$), and a fourth negative meniscus component ($L_3$) convex to the object side. Namely, in Embodiment 6 shown in FIG. 16, the third negative component ($L_3$) and the fourth negative meniscus component ($L_3'$) convex to the object side are used instead of the third negative component ($L_3$) of a doublet in other embodiments shown in FIGS. 1, 4, and 7.

With respect to the present invention, it is desirable for further correcting various aberrations to fulfill the following conditions:

$$0.4 < l_1/l_2 < 1.5$$

$$0.15 < D/\Sigma d < 0.4$$

wherein:

$l_1$ represents the axial distance between the first and second lens units (I) (II) in the infinity focusing condition, $l_2$ represents the axial distance between the second and third lens units (II) (III) in the infinity focusing condition, D represents the axial distance between the object side surface ($r_1$) of the first component ($L_1$) and the image side surface ($r_7$) of the third component ($L_3$) if the doublet is applied to the third component ($L_3$), and $\Sigma_d$ represents the total axial distance of the whole lens system. Here, if the third negative component ($L_3$) and the fourth negative meniscus component ($L_3'$) are used instead of the negative component ($L_3$) of a doublet, D represents the axial distance between the object side surface ($r_1$) of the first component ($L_1$) and the image side surface ($r_8$) of the fourth component ($L_3'$).

In accordance with the present invention, changes of the aberrations of off-axial pencils due to a focusing operation are minimized by disposing the second lens unit (II) near a position on which a main ray of the off-axial pencils pass across the optical axis. Condition (2) defines such disposition of the second lens unit (II). If the lower limit of condition (2) is violated, the second lens unit (II) is disposed so close to the first lens unit (I) that the aperture stop can not be located at the proper position between the first and second lens units (I) (II). If the upper limit of condition (2) is violated, it becomes difficult to sufficiently correct the positive distortion generated by the first lens unit (I). Furthermore, since the second lens unit (II) is shifted toward the image side for focusing to a closer object, it becomes difficult to secure the axial distance for shifting the second lens unit (II). Additionally, if either of the lower and upper limits of condition (2) is violated, the changes of various aberration during a focusing operation can not be corrected sufficiently.

Condition (3) is necessary for sufficiently correcting the spherical aberration, coma, and chromatic aberration while maintining the compact size. If the lower limit of condition (3) is violated, the back focal length is excessively increased. Thus, since the axial distance between the object side surface of the first component ($L_1$) and the image plane becomes excessively long, the compactness of the lens system can not be achieved. If the total length of the whole lens system is shortened while maintaining D constant until the lower limit of condition (3) is violated, since the refractive power of each component becomes strong, the spherical aberration and coma are deteriorated. On the other hand, if the upper limit of condition (3) is violated, it becomes difficult to sufficiently correct the chromatic aberration because the achromatic operation of the third component ($L_3$) is decreased.

In accordance with the present invention, if the doublet is applied to the third component ($L_3$) as shown in FIGS. 1, 4, 7, 10 and 13, it is further desirable for correcting aberrations to satisfy the following conditions:

$$15 < (\nu a - \nu b) < 38$$

$$(r_a - d_a) < r_b < f$$

wherein:

$\nu a$ represents the Abbe number of the positive meniscus lens in the third component ($L_3$), $\nu b$ represents the Abbe number of the negative meniscus lens in the third component ($L_3$), $r_a$ represents the radius of curvature of the object side surface ($r_5$) of the positive meniscus lens in the third component ($L_3$), $r_b$ represents the radius of curvature of the cemented surface ($r_6$) in the third component ($L_3$), $d_a$ represents the axial thickness of the positive meniscus lens in the third component ($L_3$), and f represents the focal length of the whole lens system.

Condition (4) is to sufficiently correct the chromatic aberration for the paraxial pencils and that for the off-axial pencils. If the lower limit of condition (4) is violated, the correcting effect of the chromatic aberration is decreased, and the changes of the spherical aberration and the coma due to the wavelength of light can not be controlled sufficiently. Therefore, the high contrast image can not be reproduced. If the upper limit of condition (4) is violated, it becomes difficult to sufficiently correct the lateral chromatic aberration, since the divergent power of the image side surface ($r_7$) in the third component ($L_3$) with respect to some sub-wavelength is excessively increased, though the changes of aberrations due to the wavelength of light is improved. Here, the sub-wavelength is defined to be a wavelength other than a predetermined design wavelength (D-line).

Condition (5) defines the shape of the cemented surface ($r_6$) in the third component ($L_3$). Condition (5) is determined so as to provide a proper positive refractive power with respect to the sub-wavelength to the cemented surface ($r_6$) while maintaining condition (4). If the lower limit of condition (5) is violated, since the cemented surface ($r_6$) excessively influence the sub-wavelength, the chromatic aberration of the paraxial pencils and that of the off-axial pencils are excessively unbalanced. If the upper limit of condition (5) is violated, since the correcting effect of the cemented surface ($r_6$) for the chromatic aberration is excessively decreased, the chromatic aberration is increased, which results in the deterioration of imaging property of the lens system.

The following Tables 1 to 6 disclose, respectively, the first through sixth embodiments of the present invention. In the Tables, f equals the focal length, r is the radius of curvature with respective sub numbers indicating the surfaces from the object to image side along the optical axis, d represents the axial distance and includes both the air spaces and the actual thickness of the lenses along the optical axis, N equals the refractive index and again, the sub numbers refer to the particular optical element from the object to image side, and finally, $\nu$ equals the Abbe number and sub numbers refer to the specific lens elements from the object to image side.

TABLE 1

(Embodiment 1)

$f = 100$  $F_{no.} = 2.8$  $2W = 18°$

| | | Radius of Curvature | Axial Distance | | Refractive Index (Nd) | | Abbe Number (νd) |
|---|---|---|---|---|---|---|---|
| | $r_1$ | 81.18 | $d_1$ | 7.38 | $N_1$ 1.6073 | $\nu_1$ | 59.5 |
| | $r_2$ | −10595.16 | $d_2$ | 0.15 | | | |
| | $r_3$ | 37.86 | $d_3$ | 4.81 | $N_2$ 1.6073 | $\nu_2$ | 59.5 |
| I | $r_4$ | 93.44 | $d_4$ | 0.15 | | | |
| | $r_5$ | 20.89 | $d_5$ | 6.00 | $N_3$ 1.6689 | $\nu_3$ | 45.0 |
| | $r_6$ | 50.14 | $d_6$ | 1.55 | $N_4$ 1.8052 | $\nu_4$ | 25.4 |
| | $r_7$ | 16.48 | $d_7$* | 12.54 | | | |
| | $r_8$ | 204.27 | $d_8$ | 1.28 | $N_5$ 1.8052 | $\nu_5$ | 25.4 |
| II | $r_9$ | −83.35 | $d_9$ | 1.03 | $N_6$ 1.6779 | $\nu_6$ | 53.4 |
| | $r_{10}$ | 31.35 | $d_{10}$* | 25.12 | | | |
| III | $r_{11}$ | 44.09 | $d_{11}$ | 6.08 | $N_7$ 1.5111 | $\nu_7$ | 60.5 |
| | $r_{12}$ | 819.02 | | | | | |

The asterisk (*) represents a variable air space which is varied for focusing. When focusing to a magnification $\beta = 1/10$, $d_7 = 19.23$ and $d_{10} = 18.42$.

$f_{I\,II} = 1.57f$
$\nu a - \nu b = 19.6$
$l_1/l_2 = 0.499$
$D/\Sigma d = 0.303$

TABLE 2

(Embodiment 2)

$f = 100$  $F_{no.} = 2.8$  $2W = 18°$

| | | Radius of Curvature | Axial Distance | | Refractive Index (Nd) | | Abbe Number (νd) |
|---|---|---|---|---|---|---|---|
| | $r_1$ | 79.47 | $d_1$ | 3.82 | $N_1$ 1.6177 | $\nu_1$ | 55.2 |
| | $r_2$ | 2288.53 | $d_2$ | 0.15 | | | |
| | $r_3$ | 38.76 | $d_3$ | 7.49 | $N_2$ 1.6177 | $\nu_2$ | 55.2 |
| I | $r_4$ | 75.59 | $d_4$ | 0.25 | | | |
| | $r_5$ | 21.20 | $d_5$ | 4.23 | $N_3$ 1.6700 | $\nu_3$ | 57.1 |
| | $r_6$ | 53.87 | $d_6$ | 1.50 | $N_4$ 1.7006 | $\nu_4$ | 27.6 |
| | $r_7$ | 16.95 | $d_7$* | 15.57 | | | |
| | $r_8$ | 1371.19 | $d_8$ | 2.33 | $N_5$ 1.8052 | $\nu_5$ | 25.4 |
| II | $r_9$ | −55.06 | $d_9$ | 1.03 | $N_6$ 1.6700 | $\nu_6$ | 57.1 |
| | $r_{10}$ | 30.01 | $d_{10}$* | 20.97 | | | |
| III | $r_{11}$ | 45.07 | $d_{11}$ | 3.01 | $N_7$ 1.4952 | $\nu_7$ | 79.7 |
| | $r_{12}$ | −195.30 | | | | | |

The asterisk (*) represents a variable air space which is varied for focusing. When focusing to a magnification $\beta = 1/10$, $d_7 = 21.67$ and $d_{10} = 14.27$ $f_{I\,II} = 1.98f$
$\nu a - \nu b = 29.5$
$l_1/l_2 = 0.768$
$D/\Sigma d = 0.292$

TABLE 3

(Embodiment 3)

$f = 100$  $F_{no.} = 2.8$  $2W = 18°$

| | | Radius of Curvature | Axial Distance | | Refractive Index (Nd) | | Abbe Number (νd) |
|---|---|---|---|---|---|---|---|
| | $r_1$ | 81.67 | $d_1$ | 5.38 | $N_1$ 1.6127 | $\nu_1$ | 58.5 |
| | $r_2$ | −1606.64 | $d_2$ | 0.15 | | | |
| | $r_3$ | 38.45 | $d_3$ | 5.40 | $N_2$ 1.6127 | $\nu_2$ | 58.5 |
| I | $r_4$ | 89.07 | $d_4$ | 0.15 | | | |
| | $r_5$ | 20.33 | $d_5$ | 4.78 | $N_3$ 1.6710 | $\nu_3$ | 51.7 |
| | $r_6$ | 47.84 | $d_6$ | 1.50 | $N_4$ 1.7552 | $\nu_4$ | 27.5 |
| | $r_7$ | 16.42 | $d_7$* | 14.36 | | | |
| | $r_8$ | 9885.29 | $d_8$ | 1.28 | $N_5$ 1.8052 | $\nu_5$ | 25.4 |
| II | $r_9$ | −58.06 | $d_9$ | 1.03 | $N_6$ 1.6584 | $\nu_6$ | 50.9 |
| | $r_{10}$ | 29.61 | $d_{10}$ | 24.66 | | | |
| III | $r_{11}$ | 47.11 | $d_{11}$ | 4.48 | $N_7$ 1.5168 | $\nu_7$ | 64.1 |
| | $r_{12}$ | −254.33 | | | | | |

The asterisk (*) represents a variable air space which is varied for focusing. When focusing to a magnification $\beta = 1/10$, $d_7 = 19.79$ and $d_{10} = 19.23$.

$f_{I\,II} = 1.79f$
$\nu a - \nu b = 24.2$
$l_1/l_2 = 0.582$
$D/\Sigma d = 0.275$

TABLE 4

(Embodiment 4)

$f = 100$  $F_{no.} = 2.5$  $2W = 24°$

| | | Radius of Curvature | Axial Distance | | Refractive Index (Nd) | | Abbe Number (νd) |
|---|---|---|---|---|---|---|---|
| | $r_1$ | 93.52 | $d_1$ | 6.75 | $N_1$ 1.6177 | $\nu_1$ | 49.8 |
| | $r_2$ | −524.87 | $d_2$ | 0.15 | | | |
| | $r_3$ | 41.56 | $d_3$ | 3.59 | $N_2$ 1.6176 | $\nu_2$ | 52.7 |
| I | $r_4$ | 84.59 | $d_4$ | 0.25 | | | |
| | $r_5$ | 22.56 | $d_5$ | 5.70 | $N_3$ 1.6779 | $\nu_3$ | 55.4 |
| | $r_6$ | 57.04 | $d_6$ | 1.51 | $N_4$ 1.7006 | $\nu_4$ | 27.6 |
| | $r_7$ | 17.56 | $d_7$* | 11.14 | | | |
| | $r_8$ | −368.71 | $d_8$ | 2.33 | $N_5$ 1.8052 | $\nu_5$ | 25.4 |
| II | $r_9$ | −67.95 | $d_9$ | 1.04 | $N_6$ 1.6779 | $\nu_6$ | 55.4 |
| | $r_{10}$ | 35.71 | $d_{10}$* | 24.61 | | | |
| III | $r_{11}$ | 71.40 | $d_{11}$ | 5.50 | $N_7$ 1.4952 | $\nu_7$ | 79.7 |
| | $r_{12}$ | −65.45 | | | | | |

The asterisk (*) represents a variable air space which is varied for focusing. When focusing to a magnification $\beta = 1/10$, $d_7 = 16.73$ and $d_{10} = 19.02$ $f_{I\,II} = 2.94f$
$\nu a - \nu b = 27.8$
$l_1/l_2 = 0.453$
$D/\Sigma d = 0.287$

TABLE 5

(Embodiment 5)

$f = 100$  $F_{no.} = 2.8$  $2W = 18°$

| | | Radius of Curvature | Axial Distance | | Refractive Index (Nd) | | Abbe Number (νd) |
|---|---|---|---|---|---|---|---|
| | $r_1$ | 82.93 | $d_1$ | 5.07 | $N_1$ 1.6031 | $\nu_1$ | 60.7 |
| | $r_2$ | −717.67 | $d_2$ | 0.15 | | | |
| | $r_3$ | 38.53 | $d_3$ | 8.28 | $N_2$ 1.6031 | $\nu_2$ | 60.7 |
| I | $r_4$ | 68.32 | $d_4$ | 0.25 | | | |
| | $r_5$ | 21.05 | $d_5$ | 4.51 | $N_3$ 1.6700 | $\nu_3$ | 57.1 |
| | $r_6$ | 54.18 | $d_6$ | 2.08 | $N_4$ 1.7174 | $\nu_4$ | 29.4 |
| | $r_7$ | 16.51 | $d_7$* | 15.43 | | | |
| | $r_8$ | 318.73 | $d_8$ | 2.33 | $N_5$ 1.8052 | $\nu_5$ | 25.4 |
| II | $r_9$ | −55.68 | $d_9$ | 1.03 | $N_6$ 1.7883 | $\nu_6$ | 47.3 |
| | $r_{10}$ | 31.58 | $d_{10}$* | 19.99 | | | |
| III | $r_{11}$ | 47.40 | $d_{11}$ 3.76 | | $N_7$ 1.5173 | $\nu_7$ | 69.4 |
| | $r_{12}$ | −92.13 | | | | | |

The asterisk (*) represents a variable air space which is varied for focusing. When focusing to a magnification $\beta = 1/10$, $d_7 = 21.50$ and $d_{10} = 13.92$.

$f_{I\,II} = 2.35f$
$\nu a - \nu b = 27.7$
$l_1/l_2 = 0.772$
$D/\Sigma d = 0.323$

TABLE 6

(Embodiment 6)

$f = 100$  $F_{no.} = 4.0$  $2W = 12.5°$

| | | Radius of Curvature | Axial Distance | | Refractive Index (Nd) | | Abbe Number (νd) |
|---|---|---|---|---|---|---|---|
| | $r_1$ | 37.69 | $d_1$ | 4.00 | $N_1$ 1.5173 | $\nu_1$ | 69.4 |
| | $r_2$ | −408.24 | $d_2$ | 0.15 | | | |
| | $r_3$ | 27.01 | $d_3$ | 5.00 | $N_2$ 1.4952 | $\nu_2$ | 79.7 |
| | $r_4$ | 169.78 | $d_4$ | 1.06 | | | |
| I | $r_5$ | 409.74 | $d_5$ | 1.79 | $N_3$ 1.7330 | $\nu_3$ | 28.2 |
| | $r_6$ | 47.41 | $d_6$ | 0.25 | | | |
| | $r_7$ | 18.45 | $d_7$ | 2.05 | $N_4$ 1.6661 | $\nu_4$ | 48.0 |
| | $r_8$ | 14.98 | $d_8$* | 13.58 | | | |
| | $r_9$ | −359.92 | $d_9$ | 2.30 | $N_5$ 1.8052 | $\nu_5$ | 25.4 |
| II | $r_{10}$ | −38.89 | $d_{10}$ | 1.02 | $N_6$ 1.6195 | $\nu_6$ | 43.1 |
| | $r_{11}$ | 26.98 | $d_{11}$ | 11.40 | | | |
| III | $r_{12}$ | 84.12 | $d_{12}$ | 2.05 | $N_7$ 1.5112 | $\nu_7$ | 51.0 |
| | $r_{13}$ | −107.70 | | | | | |

The asterisk (*) represents a variable air space which is varied for focusing. When focusing to a magnification $\beta = 1/10$, $d_8 = 19.37$ and $d_{10} = 5.61$.

$f_{I\,II} = 1.83f$
$l_1/l_2 = 1.19$
$D/\Sigma d = 0.32$

What is claimed is:

1. A telephoto lens system comprising from the object side to the image side;

a first lens unit of a positive refractive power consisting of a first positive component, a second positive meniscus component convex to the object side, and a third negative component of a doublet composed by cementing together a positive meniscus lens convex to the object side and a negative meniscus lens convex to the object side, the cemented surface in the third component being convex to the object side;

a second lens unit of a negative refractive power consisting of a doublet composed by cementing together a positive lens and a negative lens;

a third lens unit of a positive refractive power including at least a positive component; and the second lens unit being shiftable along the optical axis with the first and third lens unit being stationary for focusing the whole lens system.

2. A telephoto lens system as claimed in claim 1, wherein the lens system fulfills the following conditions:

$$0.4 < l_1/l_2 < 1.5$$

$$0.15 < D/\Sigma d < 0.4$$

wherein:
$l_1$ represents the axial distance between the first and second lens units in the infinity focusing condition;
$l_2$ represents the axial distance between the second and third lens units in the infinity focusing condition;
D represents the axial distance between the object side surface of the first component and the image side surface of the third component; and
$\Sigma d$ represents the total axial distance of the whole lens system.

3. A telephoto lens system as claimed in claim 2, wherein the lens system fulfills the following conditions:

$$15 < (\nu a - \nu b) < 38$$

$$(r_a - d_a) < r_b < f$$

wherein:
$\nu a$ represents the Abbe number of the positive lens in the third component;
$\nu b$ represents the Abbe number of the negative lens in the third component;
$r_a$ represents the radius of cunvature of the object side surface of the positive lens in the third component;
$r_b$ represents the radius of curvature of the cemented surface in the third component;
$d_a$ represents the axial thickness of the positive lens in the third component; and
f represents the focal length of the whole lens system in the infinity focusing condition.

4. A telephoto lens system comprising from the object side to the image side;

a first lens unit of a positive refractive power including at least a negative lens component;

a second lens unit of a negative refractive power;

a third lens unit of a positive refractive power;

the second lens unit being shiftable along the optical axis with the first and third lens units being stationary for focusing the whole lens system; and wherein the lens system fulfills the following condition:

$$1.5f < f_{I\ II} < 2.1f$$

wherein:
f represents the focal length of the whole lens system in the infinity focusing condition; and
$f_{I\ II}$ represents the compound focal length of the first and second lens units in the infinity focusing condition.

5. A telephoto lens system as claimed in claim 4, wherein the first lens unit consists of, from the object side to the image side, a first positive component, a second positive meniscus component convex to the object side, and a third negative component of a doublet composed by cementing together a positive meniscus lens convex to the object side and a negative meniscus lens convex to the object side, the cemented surface in the third component being convex to the object side, and wherein the second lens unit consists of a doublet composed by cementing together a positive lens and a negative lens, and wherein the third lens unit includes at least a positive component.

6. A telephoto lens system as claimed in claim 5, wherein the lens system further fulfills the following condition:

$$0.4 < l_1/l_2 < 1.5$$

$$0.15 < D/\Sigma d < 0.4$$

wherein:
$l_1$ represents the axial distance between the first and second lens units in the infinity focusing condition;
$l_2$ represents the axial distance between the second and third lens units in the infinity focusing condition;
D represents the axial distance between the object side surface of the first component and the image side surface of the third component; and
$\Sigma d$ represents the total axial distance of the whole lens system.

7. A telephoto lens system as claimed in claim 6, wherein the lens system further fulfills the following conditions:

$$15 < (\nu a - \nu b) < 38$$

$$(r_a - d_a) < r_b < f$$

wherein:
$\nu a$ represents the Abbe number of the positive lens in the third component;
$\nu b$ represents the Abbe number of the negative lens in the third component;
$r_a$ represents the radius of curvature of the object side surface of the positive meniscus lens in the third component;
$r_b$ represents the radius of curvature of the cemented surface of the third component;
$d_a$ represents the axial thickness of the positive lens in the third component; and
f represents the focal length of the whole lens system in the infinity focusing position.

8. A telephoto lens system as claimed in claim 4, wherein the first lens unit consists of, from the object side to the image side, a first positive component, a second positive component, a third negative component, and a fourth negative meniscus component convex to the object side, and wherein the second lens unit consists of a doublet composed by cementing together a positive lens and a negative lens, and wherein the third lens unit includes at least a positive component.

9. A telephoto type lens system as claimed in claim 8, wherein the lens system fulfills the following conditions:

$$0.4 < l_1/l_2 < 1.5$$

$$0.15 < D/\Sigma d < 0.4$$

wherein:
- $l_1$ represents the axial distance between the first and second lens units in the infinity focusing condition; and
- $l_2$ represents the axial distance between the second and third lens units in the infinity focusing condition;
- D represents the axial distance between the object side surface of the first component and the image side surface of the fourth component; and
- $\Sigma d$ represents the total axial distance of the whole lens system.

10. A telephoto lens system of an internal focusing type comprising the following design parameters:

| | | f = 100 | $F_{no.}$ = 2.8 | 2W = 18° | | | |
|---|---|---|---|---|---|---|---|
| | | Radius of Curvature | Axial Distance | | Refractive Index (Nd) | | Abbe Number (νd) |
| I | $r_1$ | 81.18 | $d_1$ | 7.38 | Nd 1.6073 | νd | 59.5 |
| | $r_2$ | −10595.16 | $d_2$ | 0.15 | | | |
| | $r_3$ | 37.86 | $d_3$ | 4.81 | Nd 1.6073 | νd | 59.5 |
| | $r_4$ | 93.44 | $d_4$ | 0.15 | | | |
| | $r_5$ | 20.89 | $d_5$ | 6.00 | Nd 1.6689 | νd | 45.0 |
| | $r_6$ | 50.14 | $d_6$ | 1.55 | Nd 1.8052 | νd | 25.4 |
| | $r_7$ | 16.48 | $d_7$* | 12.54 | | | |
| II | $r_8$ | 204.27 | $d_8$ | 1.28 | Nd 1.8052 | νd | 25.4 |
| | $r_9$ | −83.35 | $d_9$ | 1.03 | Nd 1.6779 | νd | 53.4 |
| | $r_{10}$ | 31.35 | $d_{10}$* | 25.12 | | | |
| III | $r_{11}$ | 44.09 | $d_{11}$ | 6.08 | Nd 1.5111 | νd | 60.5 |
| | $r_{12}$ | 819.02 | | | | | |

The asterisk (*) represents a variable air space which is varied for focusing. When focusing to a magnification $\beta$ = 1/10, $d_7$ = 19.23 and $d_{10}$ = 18.42

* * * * *

UNITED STATES PATENT AND TRADEMARK OFFICE
CERTIFICATE OF CORRECTION

PATENT NO. : 4,610,514
DATED : September 9, 1986
INVENTOR(S) : AKIYOSHI NAKAMURA It is certified that error appears in the above-identified patent and that said Letters Patent is hereby corrected as shown below:

Col. 1, line 20: delete "requires", insert --require--.

Col. 3, line 42: delete "(II)", insert --(III)--;

line 56: delete "(II)", insert --(III)--.

Col. 4, line 18: delete "(II)", insert --(III)--;

line 22: before "1.5f", insert --(1) --;

line 29: delete "Embodiment", insert --Embodiments--;

line 50: delete "(II)", insert --(III)--;

line 66: delete "$(L_3)$", insert --$(L_3')$--.

Col. 5, line 8: before "0.4", insert --(2) --;

line 11: before "0.15", insert --(3) --;

line 24: delete "$\Sigma_d$", insert --$\Sigma d$--.

UNITED STATES PATENT AND TRADEMARK OFFICE
CERTIFICATE OF CORRECTION

PATENT NO. : 4,610,514
DATED : September 9, 1986
INVENTOR(S) : AKIYOSHI NAKAMURA It is certified that error appears in the above-identified patent and that said Letters Patent is hereby corrected as shown below:

Col. 6, line 6: before "15", insert --(4) --;

line 8: before "$(r_a-d_a)$", insert --(5) --.

Col. 8, Table 5, $r_{11}$: delete "$N_7$", insert --3.76--;

delete "1.5173", insert "$N_7$";

delete "$\nu_7$", insert --1.5173--;

delete "69.4", insert --$\nu_7$--;

after "$\nu_7$", insert --69.4--; and below "$d_{11}$", delete "3.76".

Signed and Sealed this

Seventeenth Day of November, 1987

Attest:

DONALD J. QUIGG

*Attesting Officer*   *Commissioner of Patents and Trademarks*